(12) United States Patent
Kashiwagi et al.

(10) Patent No.: US 8,480,242 B2
(45) Date of Patent: Jul. 9, 2013

(54) METHOD FOR PRODUCING OPTICAL SHEET, OPTICAL SHEET AND VIDEO DISPLAY DEVICE

(75) Inventors: Tsuyoshi Kashiwagi, Tokyo-to (JP); Futoshi Osawa, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 344 days.

(21) Appl. No.: 12/829,578

(22) Filed: Jul. 2, 2010

(65) Prior Publication Data
US 2011/0043921 A1   Feb. 24, 2011

(30) Foreign Application Priority Data

Jul. 6, 2009   (JP) ................................. 2009-160285
Jun. 15, 2010   (JP) ................................. 2010-135987

(51) Int. Cl.
*G02B 27/00* (2006.01)
*G02B 3/00* (2006.01)
*G03B 21/60* (2006.01)

(52) U.S. Cl.
USPC ......................... 359/614; 359/454; 264/1.32

(58) Field of Classification Search
USPC ................ 359/614, 625, 618–621, 626, 443, 359/454–455; 264/1.1, 1.32, 2.7
See application file for complete search history.

(56) References Cited

U.S. PATENT DOCUMENTS

2009/0091824 A1 * 4/2009 Yamashita et al. ............ 359/453

FOREIGN PATENT DOCUMENTS

| JP | 2008-083371 A | 4/2008 |
| JP | 2008-146074 A | 6/2008 |
| JP | 2008-277808 A | 11/2008 |
| JP | 2009-080198 A | 4/2009 |
| WO | WO 2006090784 A1 * | 8/2006 |

* cited by examiner

*Primary Examiner* — Dawyane A Pinkney
(74) *Attorney, Agent, or Firm* — Ladas & Parry LLP

(57) ABSTRACT

The present invention provides a method for manufacturing optical sheet having an improved appearance, optical sheet, and an image display device having the optical sheet. The method for manufacturing optical sheet having a plurality of layers in which at least one layer is an optical functional sheet layer comprises: light-transmissive portions configured to be arranged in a row along the surface of a base material layer; and light-absorbing portions arranged between the light-transmissive portions, the method comprising the steps of: forming the light-transmissive portions on one side of the base material layer; and forming the light-absorbing portions repeatedly by filling a binder made of a resin in which light-absorbing particles are dispersed in the gaps between the light-transmissive portions and curing the binder, wherein at least the last step of the repeating step for forming the light-absorbing portions is carried out so that the density of the light-absorbing particles contained in the binder is lower than the density of the same at the first step for forming the light-absorbing portion. The optical sheet is produced by the method; and the image display device is provided with the optical sheet.

10 Claims, 11 Drawing Sheets

METHOD FOR PRODUCING OPTICAL SHEET, OPTICAL SHEET AND VIDEO DISPLAY DEVICE

BACKGROUND OF THE INVENTION

1. Field of the Invention

The present invention relates to a method for manufacturing an optical sheet which controls an image light emitted from an image light source to output the light to the observer side, an optical sheet, and an image display device having the optical sheet.

2. Description of the Related Art

An image display device for outputting the image to the observer, such as liquid crystal display, plasma display, rear-projection display, organic EL, and FED, is provided with an image light source and an optical sheet comprising layers having various functions for improving the quality of an image light emitted from the image light source and outputting the image light to the observer.

There are several arts related to the optical sheets. For example, Patent document 1 (i.e. Japanese Patent Application Laid-open No. 2008-146074) discloses one of them. Patent document 1 focuses onto an external light shielding film (i.e. one of the layers constituting an optical sheet and is equivalent to the "optical functional sheet layer" of the present invention. Hereinafter, referred to as "optical functional sheet layer".) and discloses a method for manufacturing the optical functional sheet layer. More specifically, Patent document 1 discloses a method characterized by filling more than once a light absorbing body made of a resin (i.e. equivalent to "binder made of resin" of the present invention. Hereinafter referred to as "binder".) containing a light absorbing substance (i.e. equivalent to the "light-absorbing particle" of the present invention. Hereinafter, referred to as "light-absorbing particle".) in a groove formed in the plane of the optical functional sheet layer. In the method for manufacturing the optical functional sheet layer described in Patent document 1, in view of filling the light absorbing body containing high density of the light-absorbing particles and improving function of external light shielding, preferably, the step of filling the light absorbing body is carried out more than once; and the density of the light-absorbing particles contained in the light absorbing body becomes higher each time.

SUMMARY OF THE INVENTION

However, as seen from the art described in Patent document 1, if the binder and light-absorbing particles are filled in the optical functional sheet while raising the density of the light-absorbing particles dispersed in the binder step-by-step, when strickling the excessive amount of binder and light-absorbing particles after filling the binder and the light-absorbing particles, the portion of binder is strickled by the light-absorbing particles from the area where the binder and the light-absorbing particle is supposed to be filled in. So, the appearance of the optical functional sheet layer is poor due to the occurrence of streaky unevenness. It is assumed that the light-absorbing particles protruding from the surface of the optical functional sheet layer are dragged and remove the binder when strickling the excessive amount of binder and light-absorbing particle.

When an optical functional sheet layer having the streaky poor appearance and other layers are laminated to form an optical sheet, the streaky unevenness negatively affects the surface appearance of the optical sheet.

Accordingly, an object of the present invention is to provide a method for manufacturing optical sheet having an improved appearance, an optical sheet produced by the method, and an image display device having the optical sheet.

As a result of intensive study by the inventors, they discovered that when filling the binder containing the light-absorbing particles in the optical functional sheet layer, it is possible to obtain an optical sheet having an improved appearance by: filling the binder more than once while lowering the density of the light-absorbing particles contained in the binder step-by-step; coating, with a transparent resin, the surface of the optical functional sheet layer after filling the binder containing the light-absorbing particles; or filling a transparent resin in a plane of the optical functional sheet layer after filling the binder containing the light-absorbing particles, by pressing with a mirror-surface imprint mold.

Hereinafter, the present invention will be described. In order to make the understanding of the present invention easier, reference numerals of the attached drawings are quoted in brackets; however, the present invention is not limited by the embodiment shown in the drawings.

The first aspect of the present invention solves the above problems by providing a method for manufacturing optical sheet having a plurality of layers in which at least one layer is an optical functional sheet layer (10) comprising: light-transmissive portions (2, 2, . . . ) configured to be arranged in a row along the surface of a base material layer (1); and light-absorbing portions (3, 3, . . . ) arranged between the light-transmissive portions, the method comprising the steps of: forming the light-transmissive portions on one side of the base material layer; and forming the light-absorbing portions repeatedly by filling a binder made of a resin in which light-absorbing particles (5, 5, . . . ) are dispersed in the gaps between the light-transmissive portions and curing the binder, wherein at least the last step of the repeating step for forming the light-absorbing portions is carried out so that the density of the light-absorbing particles contained in the binder is lower than the density of the same at the first step for forming the light-absorbing portion.

In the invention, the phrase "the light-transmissive portions configured to be arranged in a row along the surface of a base material layer" does not limit the state where the light-transmissive portions are arranged in a row in one direction on the base material layer; the phrase includes the state where the light-transmissive portions are arranged along the surface of the base material layer with a certain regularity. Therefore, for example, the light-transmissive portions may be arranged obliquely along the surface of the base material layer or arranged in a reticular pattern. The phrase "the density of the light-absorbing particles contained in the binder" means a mass ratio between the binder and the light-absorbing particles contained in the binder.

The second aspect of the invention solves the above problems by providing a method for manufacturing optical sheet having a plurality of layers in which at least one layer is an optical functional sheet layer (11) comprising: light-transmissive portions (2, 2, . . . ) configured to be arranged in a row along the surface of a base material layer (1); and light-absorbing portions (13, 13, . . . ) arranged between the light-transmissive portions, the method comprising the steps of: forming the light-transmissive portions on one side of the base material layer; forming the light-absorbing portions by, at least once, filling a binder made of a resin in which light-absorbing particles are dispersed in the gaps between the light-transmissive portions and curing the binder; and then, filling a transparent resin in the gap between the light-transmissive portions and curing the transparent resin (6).

The phrase "forming the light-absorbing portions by, at least once, filling a binder made of a resin in which light-absorbing particles are dispersed in the gaps between the light-transmissive portions and curing the binder" means that the light-absorbing particles and the binder may be filled and cured in one shot or may be filled and cured more than once. The phrase "filling a transparent resin in the gap between the light-transmissive portions (after forming the light-absorbing portion)" means that after forming the light-absorbing portion, a transparent resin is filled in a recess portion remained on top of the portion where the light-absorbing particles and the binder are filled in the step for filling the light-absorbing particles between the light-transmissive portions.

The third aspect of the present invention solves the above problems by providing a method for manufacturing optical sheet having a plurality of layers in which at least one layer is an optical functional sheet layer (20) comprising: light-transmissive portions (2, 2, ... ) configured to be arranged in a row along the surface of a base material layer (1); and light-absorbing portions (23, 23, ... ) arranged between the light-transmissive portions, the method comprising the steps of: forming the light-transmissive portions on one side of the base material layer; forming the light-absorbing portions by filling a binder made of a resin in which light-absorbing particles (5, 5, ... ) are dispersed in the gaps between the light-transmissive portions; strickling the excessive amount of binder overflowing from the gaps between the light-transmissive portions; and then, coating, with a transparent resin (21), a plane where recess portions (22) formed by strickling are exposed.

The fourth aspect of the present invention solves the above problems by providing a method for manufacturing optical sheet having a plurality of layers in which at least one layer is an optical functional sheet (20) layer comprising: light-transmissive portions (2, 2, ... ) configured to be arranged in a row along the surface of a base material layer (1); and light-absorbing portions (23, 23, ... ) arranged between the light-transmissive portions, the method comprising the steps of: forming the light-transmissive portions on one side of the base material layer; forming the light-absorbing portions by filling a binder made of a resin in which light-absorbing particles (5, 5, ... ) are dispersed in the gaps between the light-transmissive portions; strickling the excessive amount of binder overflowing from the gaps between the light-transmissive portions; and then, filling a transparent resin (21) in a plane where recess portions (22) formed by strickling are exposed, by pressing with a mirror-surface imprint mold.

The fifth aspect of the present invention solves the above problems by providing an optical sheet having a plurality of layers in which at least one layer is an optical functional sheet layer (10) comprising: light-transmissive portions (2, 2, ... ) configured to be arranged in a row along the surface of a base material layer (1); and light-absorbing portions (3, 3, ... ) arranged between the light-transmissive portions, the light-absorbing portions being filled with binder in which light-absorbing particles (5, 5, ... ) are dispersed, and the density of the light-absorbing particles of the light-absorbing portions in the base material layer side being higher than the density of the light-absorbing particles of the light-absorbing portions in the opposite side.

The sixth aspect of the present invention solves the above problems by providing an optical sheet having a plurality of layers in which at least one layer is an optical functional sheet layer (20) comprising: light-transmissive portions (2, 2, ... ) configured to be arranged in a row along the surface of a base material layer (1); and light-absorbing portions (23, 23, ... ) arranged between the light-transmissive portions, the light-absorbing portions being filled with binder in which light-absorbing particles (5, 5, ... ) are dispersed, and the surface including recess portions (22) formed between the light-transmissive portions being coated with a transparent resin (21).

The seventh aspect of the present invention is according to the sixth aspect of the invention, wherein a surface of the optical functional sheet layer (20) coated with the transparent resin (21) is a mirror plane. The term "mirror plane" means a flat plane without recesses and protrusions along the longitudinal direction of the light-absorbing portion.

The eighth aspect of the present invention solves the above problems by providing an image display device comprising an optical sheet according to any one of the fifth to seventh aspects of the invention.

According to the present invention, it is possible to provide a method for manufacturing optical sheet having an improved appearance, an optical sheet produced by the method, and an image display device having the optical sheet.

DESCRIPTION OF THE REFERENCE NUMERALS

Figure 1:
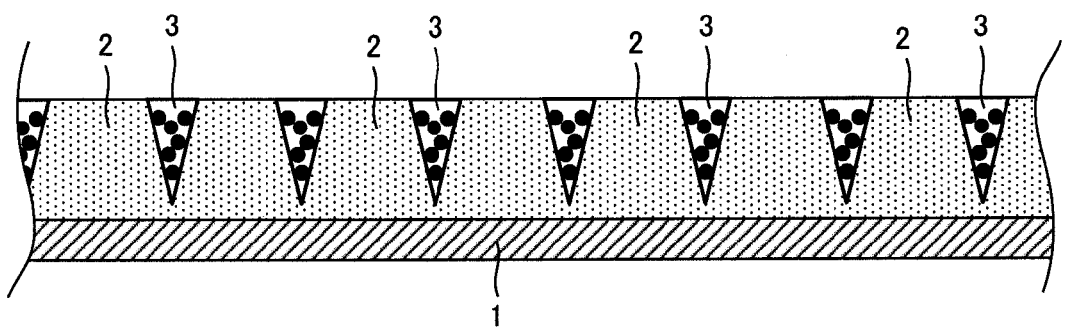
FIG. 1 is a cross-sectional view schematically showing a part of an optical functional sheet layer of an optical sheet obtained by the method for manufacturing optical sheet according to the first mode of the present invention.

| | |
|---|---|
| 1 | base material layer |
| 2, 2c, 2d, 2e | light-transmissive portion |
| 3, 3a, 3c, 3d, 3e, 13, 13a, 23 | light-absorbing portion |
| 3b, 13b, 22, 23b | recess portion |
| 4 | binder portion |
| 5 | light-absorbing particle |
| 6 | transparent resin |
| 10, 11, 20 | optical functional sheet layer |
| 21 | transparent resin |

DESCRIPTION OF THE PREFERRED EMBODIMENTS

The functions and benefits of the present invention will be apparent from the following best modes for carrying out the invention. Hereinafter, the invention will be described by way of the following modes shown in the drawings. However, the invention is not limited to the embodiments.

1 Method for Manufacturing an Optical Sheet

1.1. The First Mode of the Invention

FIG. 1 is a cross-sectional view schematically showing a part of an optical functional sheet layer 10 of an optical sheet obtained by the method for manufacturing optical sheet according to the first mode of the present invention. In FIG. 1, in view of viewability, the repeating reference numerals are partly omitted (the repeating reference numerals are partly omitted in the following figures in the same manner.). As shown in FIG. 1, the optical functional sheet layer 10 comprises light-transmissive portions 2, 2, . . . formed on the base material layer 1 and the light-absorbing portions 3, 3, . . . . The optical functional sheet layer 10 extends in a front-to-back direction of the sheet of FIG. 1 maintaining the cross-section shown in FIG. 1.

Figure 2:
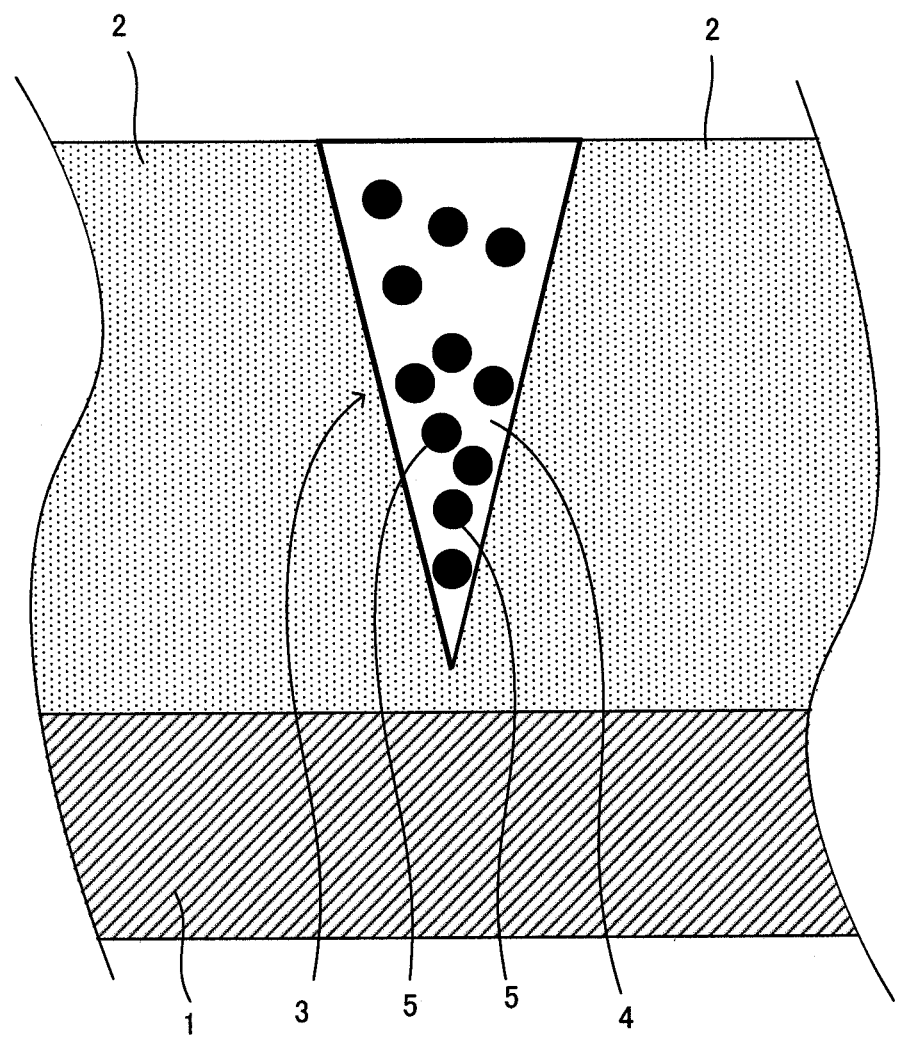
FIG. 2 is an enlarged plan of a part of the optical functional sheet layer shown in FIG. 1.

The optical functional sheet layer 10 comprises: light-transmissive portions 2, 2, . . . having substantially trapezoidal section in the layer thickness direction; and light-absorbing portions 3, 3, . . . arranged between the adjacent light-transmissive portions 2, 2, . . . . FIG. 2 is an enlarged plan focusing on one light-absorbing portion 3 and two light-transmissive portions 2, 2 adjacent to the light-absorbing portion 3. The optical functional sheet layer 10 will be described with reference to FIGS. 1 and 2.

The light-transmissive portions 2, 2 . . . are elements having a substantially trapezoidal cross-section of which upper base is arranged on one plane of the optical functional sheet and of which lower base is arranged on the plane of the base material of the optical functional sheet. It should be noted that the cross-sectional shape of the light-transmissive portion may be rectangle; so, as described below, the cross-sectional shape of the light-transmissive portion is not limited to substantially trapezoid and rectangle. The light-transmissive portions 2, 2, . . . are made of a light-transmissive resin having a refractive index $N_p$.

The light-transmissive resin constituting the light-transmissive portion is preferably, for example, a light curable resin composition in which a reactive diluent monomer (M1) and a photopolymerization initiator (S1) are added to a light curable prepolymer (P1).

Examples of the light curable prepolymer (P1) include: epoxy acrylate-based, urethane acrylate-based, polyether acrylate-based, polyester acrylate-based, and polythiol-based prepolymer.

Examples of the reactive diluent monomer (M1) include: vinylpyrrolidone, 2-ethylhexyl acrylate, β-hydroxy acrylate, and tetrahydrofurfuryl acrylate.

Examples of the photopolymerization initiator (S1) include: hydroxybenzoyl compounds such as 2-hydroxy-2-methyl-1-phenylpropane-1-one, 1-hydroxycyclohexyl phenyl ketone, and benzoin alkyl ether; benzoyl formate compounds such as methyl benzoyl formate; thioxanthone compounds such as isopropyl thioxanthone; benzophenones such as benzophenone; acylphosphine oxide compounds such as 2,4,6-trimethylbenzoyl diphenylphosphine oxide, bis (2,4,6-trimethylbenzoyl)phenylphosphine oxide; and benzyl dimethyl ketal. Among them, photopolymerization initiator can be arbitrarily selected depending on the irradiation apparatus for curing light curable resin composition and curing property of the light curable resin composition. The preferable ones in view of color protection of the light-transmissive portions 13, 13, . . . are 2-hydroxy-2-methyl-1-phenylpropane-1-one, 1-hydroxycyclohexyl phenyl ketone, and bis(2,4,6-trimethyl benzoyl) phenylphosphine oxide.

The amount of photopolymerization initiator (S1) contained in the light curable resin composition, in view of curing property and cost of the light curable resin composition, is preferably 0.5-5.0 mass % based on a total amount of the composition constituting the light-transmissive portion as 100 mass %. In general, photopolymerization initiator is substantially colorless after polymerization. The photopolymerization initiator may be colored (for example, in yellow) on the condition that it becomes substantially colorless when the composition constituting the light-transmissive portion is cured to form the light-transmissive portion.

The light curable prepolymer (P1), reactive diluent monomer (M1), and photopolymerization initiator (S1) to be used may respectively be single species or a combination of two or more species thereof.

As required, for property modification as well as improvement of coating properties and of mold releadability from the die rolls when using die rolls in the production process, various additives such as silicone-based additives, rheology control agent, antifoaming agent, mold release agent, antistatic agent, and ultraviolet absorber can be included in the composition constituting the light-transmissive portion.

The light-absorbing portions 3, 3, . . . are elements which are arranged between the adjacent light-transmissive portions 2, 2, . . . and having substantially triangle cross-section shown in FIG. 1. The substantially triangles in cross-section are aligned so that the face equivalent to the bottom of the substantially triangles extends on the upper base of the light-transmissive portions 2, 2, . . . . So, one face of the optical functional sheet layer 10 is formed by the bottom of the light-absorbing portions 3, 3, . . . and the upper base of the light-transmissive portion 2, 2, . . . . Here, the oblique lines of the substantially triangle cross-section of the light-absorbing portions 3, 3, . . . preferably make an angle of 0-10° against normal to the plane of the optical functional sheet layer 10. When the angle of the oblique line is nearly 0°, the shape of the light-absorbing portion is no longer triangle; it is rectangle. As described below, the cross-sectional shape of the light-absorbing portion is not limited to substantially triangle and rectangle.

The light-absorbing portions 3, 3, . . . are formed of a certain material of which refractive index is the same as the refractive index $N_p$ of the light-transmissive portions 2, 2, . . . or is refractive index $N_b$ smaller than refractive index $N_p$. By setting the relation between the refractive index $N_p$ of the light-transmissive portions 2, 2 . . . and the refractive index $N_b$ of the light-absorbing portions 3, 3, . . . as $N_p \geq N_b$, it is possible to adequately reflect an image light from the light source which has entered into the light-transmissive portions 2, 2, . . . under certain conditions at an interface between the light-absorbing portions 3, 3, . . . and the light-transmissive portions 2, 2, . . . and possible to provide a bright image to the observer. The difference between the refractive indices $N_p$ and $N_b$ are not particularly limited; it is preferably 0 or more and 0.06 or less.

In addition, the light-absorbing portions 3, 3, . . . of the optical functional sheet layer 10 comprises: light-absorbing particles 5, 5, . . . ; and a binder portion 4 to be filled between the outer periphery of the light-absorbing portions 3, 3, . . . and the light-absorbing particles 5, 5, . . . . In other words, the light-absorbing particles 5, 5, . . . are dispersed in the binder portion 4. By this configuration, the image light entering into the light-absorbing portions 3, 3, . . . , but not being reflected at an interface between the light-transmissive portions 2, 2, . . . and the light-absorbing portions 3, 3, . . . , can be absorbed by the light-absorbing particles 5, 5, . . . . Moreover, an external light entering at a certain angle from the observer side can be adequately absorbed; thereby the contrast can be improved.

In this case, binder material for forming the binder portion 4 is the above material having refractive index $N_b$.

The light-absorbing portion is formed by, for example, dispersing light-absorbing particles in a light curable resin as the binder material. The material to be used as the binder is not particularly limited; for instance, a light curable resin composition in which a reactive diluent monomer (M2) and a photopolymerization initiator (S2) are mixed with a light curable prepolymer (P2) is preferably used.

Examples of light curable prepolymer (P2) include: urethane (meth)acrylate, polyester (meth)acrylate, epoxy (meth) acrylate, and butadiene (meth)acrylate.

Examples of the reactive diluent monomer (M2) as monofunctional monomer include: vinyl monomers such as N-vinylpyrrolidone, N-vinylcaprolactone, vinylimidazole, vinylpyridine, and stylene; monomers of (meth)acrylic acid ester such as lauryl (meth)acrylate, stearyl (meth)acrylate, butoxyethyl (meth)acrylate, ethoxy diethylene glycol (meth) acrylate, methoxy triethylene glycol (meth)acrylate, methoxy polyethylene glycol (meth)acrylate, methoxy dipropylene glycol (meth)acrylate, para-cumyl phenoxyethyl (meth) acrylate, nonylphenoxy polyethylene glycol (meth)acrylate, tetrahydrofurfuryl (meth)acrylate, isobornyl (meth)acrylate, cyclohexyl (meth)acrylate, benzyl methacrylate, N,N-dimethyl (meth)acrylamide, N,N-dimethylaminopropyl (meth) acrylate, and acryloylmorpholine; and the (meth)acrylamide derivatives. Examples of the reactive diluent monomer (M2) as multifunctional monomer include: ethylene glycol di(meth)acrylate, diethylene glycol di(meth)acrylate, triethylene glycol di(meth)acrylate, polyethylene glycol di(meth) acrylate, tripropylene glycol di(meth)acrylate, polytetramethylene glycol di(meth)acrylate, 1,4-butanediol di(meth) acrylate, 1,6-hexanediol di(meth)acrylate, 1,9-nonanediol di(meth)acrylate, 3-methyl-1,5-pentanediol di(meth)acrylate, neopentyl glycol di(meth)acrylate, dimethyloltricyclodecane di(meth)acrylate, hydroxy pivalic acid neopentyl glycol di(meth)acrylate, bisphenol-A polypropoxydiol di(meth) acrylate, trimethylolpropane tri(meth)acrylate, ethoxylated trimethylolpropane tri(meth)acrylate, propoxylated trimethylolpropane tri(meth)acrylate, pentaerythritol tri(meth) acrylate, glyceryl tri(meth)acrylate, propoxylated glyceryl tri(meth)acrylate, tris(2-hydroxyethyl) isocyanurate triacrylate, pentaerythritol tetra(meth)acrylate, ditrimethylolpropane tetra(meth)acrylate, dipentaerythritol penta(meth)acrylate, and dipentaerythritol hexa(meth)acrylate.

Examples of the photopolymerization initiator (S2) include: 1-hydroxycyclohexyl phenyl ketone, 2-hydroxy-2-methyl-1-phenylpropane-1-one, 2,2-dimethoxy-1,2-diphenylethane-1-one, 2,4,6-trimethylbenzoyl diphenylphosphine oxide, and bis(2,4,6-trimethylbenzoyl) phenylphosphine oxide. Among them, the photopolymerization initiator (S2) can be arbitrarily selected depending on the irradiation apparatus for curing light curable resin composition and curing property of the light curable resin composition.

In view of curing property and cost of the light curable resin composition, the amount of photopolymerization initiator (S2) contained in the light curable resin composition based on a total amount of the light curable resin composition (100 mass %) is preferably 0.5-10.0 mass %.

The light curable prepolymer (P2), reactive diluent monomer (M2), and photopolymerization initiator (S2) to be used may respectively be single species or a combination of two or more species thereof.

More specifically, these are arbitrarily mixed in view of refractive index, viscosity, effect on the property of the optical functional sheet layer 10, and so on of the photopolymerizable component (specifically, the light curable prepolymer (P2) and the reactive diluent monomer (M2)) consisting of urethane acrylate, epoxy acrylate, tripropylene glycol diacrylate, and methoxy triethylene glycol acrylate.

Moreover, as required, additives such as silicone, antifoaming agent, leveling agent, and solvent may be added to the composition constituting the light-absorbing portion.

As the light-absorbing particle, light-absorbing colored particles such as carbon black are preferably used. However, the light-absorbing particle is not limited to it; colored particles which can selectively absorb a light having a certain wavelength can be used depending on the properties of the image light. More specifically, for example, colored glass beads or organic particulates colored by carbon black, graphite, metal salt such as black iron oxide, dye, and pigment, may be used. Particularly, in view of cost, quality, and availability, the colored organic particulates are preferably used. More specifically, for example, acrylic cross-linked particulate containing carbon black and urethane cross-linked particulate containing carbon black are preferably used. Such colored particles are usually contained in the composition constituting the light-absorbing portion within the range of 3-30 mass %. The average diameter of the colored particles is preferably 1.0 μm or more and 20 μm or less. As described below, when the light-absorbing portions 3, 3, . . . are formed, a step for strickling the excessive amount of the composition constituting the light-absorbing portion by using doctor blade is included after filling the composition constituting the light-absorbing portion containing the colored particles in a groove between the light-transmissive portions 2, 2, . . . . By using colored particles having an average diameter of 1.0 μm or more, the colored particles hardly slip through the gap between the doctor blade and the upper side of the light-transmissive portions 2, 2, . . . . So, it is possible to prevent the colored particles from remaining on the upper plane of the light-transmissive portions 2, 2, . . . .

Density of the light-absorbing particles 5, 5, . . . in the base material layer 1 side (lower side of FIGS. 1 and 2) of the light-absorbing portions 3, 3, . . . is higher than density of the light-absorbing particles 5, 5, . . . in the opposite side (upper side of FIGS. 1 and 2) of the light-absorbing portions 3, 3, . . . .

Next, the base material layer 1 will be described. The base material layer 1 is a base film layer on which the above-described light-transmissive portions 2, 2, . . . and the light-absorbing portions 3, 3, . . . are formed. The base material layer 1 contains polyethylene terephthalate (PET) as the main component; the base material layer 1 is integrally formed as a part of the optical functional sheet layer. As long as PET is contained in the base material layer 1 as the main component, the base material layer 1 may contain other resins. In addition, various additives may be adequately added thereto. Examples of conventional additives include: antioxidant such as phenol-based compounds and stabilizer such as lactone-based compounds. The term "main component" means that 50 mass % or more of PET is contained based on the whole material for forming the base material layer (hereinafter, it means the same.).

The material constituting the base material layer 1 is not necessarily PET; other materials can be used. Examples of other materials include: polyester-based resins such as polybutylene terephthalate, polyethylene naphthalate, terephthalic acid-isophthalic acid-ethylene glycol copolymer, terephthalic acid-cyclohexane dimethanol-ethylene glycol copolymer; polyamide-based resins such as nylon 6; polyolefin-based resins such as polypropylene and polymethyl pentene; acrylic resins such as polymethyl methacrylate; styrene-based resins such as polystyrene and styrene-acrylonitrile copolymer; cellulose-based resins such as triacetyl cellulose; imide-based resins; and polycarbonate resins. To these resins, as required, additives such as ultraviolet absorber, filler, plasticizer, and antistatic agent may be adequately added. In this mode, in view of mass production, cost, and availability as well as its performance, a base material layer 1 made of a resin mainly containing PET is described as a preferable material of the invention.

Figure 3A:
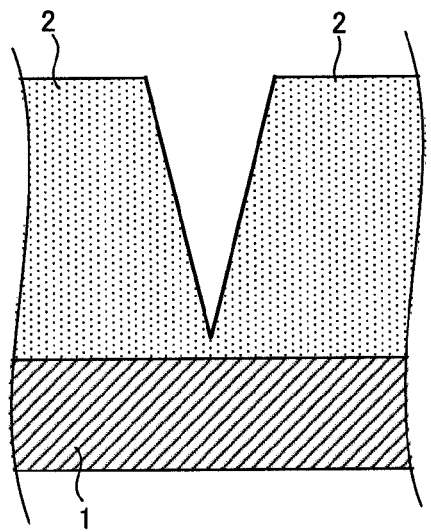
FIGS. 3A, 3B, and 3C are plans to illustrate each manufacturing step of the optical functional sheet layer shown in FIG. 1.
Figure 3B:
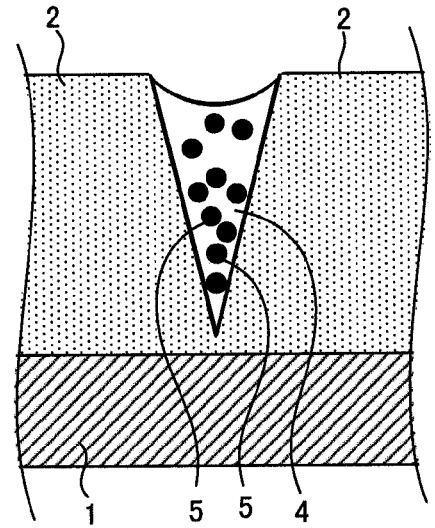
Figure 3C:
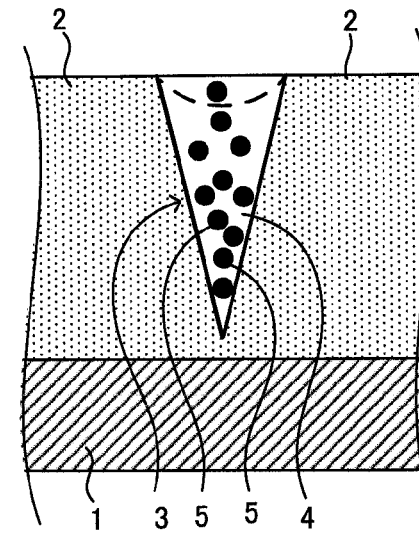

The method for manufacturing the optical functional sheet layer 10 will be described with reference to FIGS. 3A to 3C. FIGS. 3A, 3B, and 3C are plans to respectively illustrate each manufacturing step of the optical functional sheet 10 layer.

The above-described optical functional sheet layer 10 can be obtained by the steps of: forming the light-transmissive portions 2, 2, . . . on one surface of the base material layer 1 (step for forming the light-transmissive portions); and then, alternately repeatedly filling a binder comprising a resin in which the light-absorbing particles 5, 5, . . . are dispersed into the gap between the light-transmissive portions 2, 2, . . . and curing the binder (step for forming the light-absorbing portions). Among the plurality of the steps for forming the light-absorbing portions, at least the last step for forming the light-absorbing portions is carried out so that the density of the light-absorbing particles 5, 5, . . . contained in the binder is lower than the density of the same at the first step for forming the light-absorbing portion.

It is more specifically described as follows.

Firstly, as shown in FIG. 3A, light-transmissive portions 2, 2 are formed on one surface of the base material layer 1. The method for forming the light-transmissive portions 2, 2, . . . is not particularly limited; conventional known methods can be used. For example, the light-transmissive portions 2, 2, . . . can be formed on the base material layer 1 by the steps of: providing a resin constituting the light-transmissive portions 2, 2, . . . on the base material layer 1; and pressing the resin with a certain pressure by die rolls of which outer circumferential surface has recess portions corresponding to the shapes of the light-transmissive portions 2, 2, . . . desired to be formed; and curing the resin.

Figure 4A:
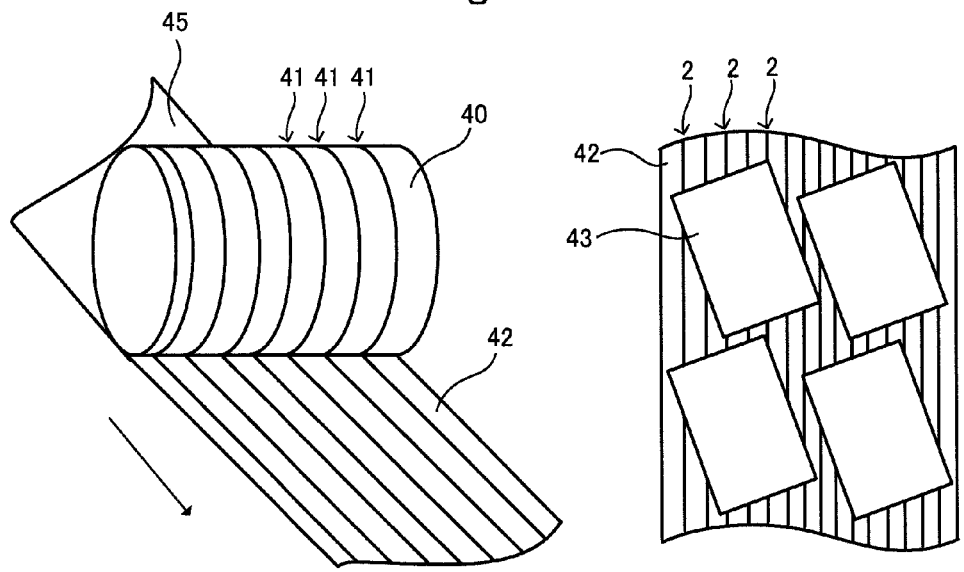
FIGS. 4A and 4B are plans to illustrate methods for forming a preferable light-transmissive portion.
Figure 4B:
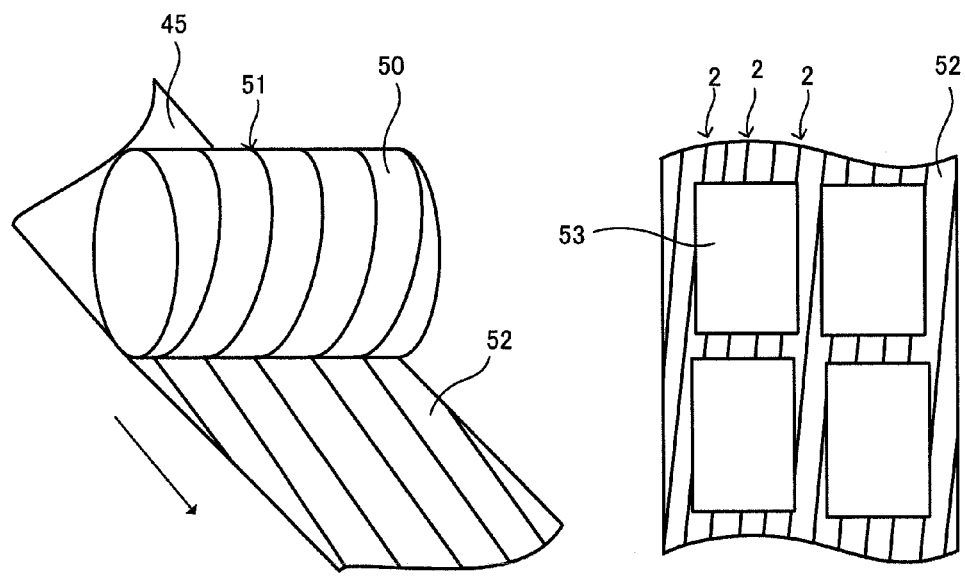

More specifically, the light-transmissive portions 2, 2, . . . are preferably formed by the method described below. Hereinafter, with reference to FIGS. 4A and 4B, preferable methods for forming the light-transmissive portions 2, 2, . . . will be described. FIG. 4A illustrates a way to form the light-transmissive portions 2, 2, . . . by using a die roll 40 where recess portions 41, 41, . . . corresponding to the shape of light-transmissive portions 2, 2, . . . desired to be formed are formed in the outer circumferential surface in the circumferential direction. FIG. 4B illustrates another way to form the light-transmissive portions 2, 2, . . . by using a die roll 50 where recess portions 51, 51, . . . corresponding to the shape of light-transmissive portions 2, 2, . . . desired to be formed are formed in the outer circumferential surface in a direction at an angle with respect to the circumferential direction.

As shown in the left part of FIG. 4A, when forming the light-transmissive portions 2, 2, . . . by using a die roll 40 where recess portions 41, 41, . . . corresponding to the shape of light-transmissive portions 2, 2, . . . desired to be formed are formed in the outer circumferential surface in the circumferential direction, it is possible to obtain a sheet 42 in which the light-transmissive portions 2, 2, . . . are formed on the base material 45 in parallel with the transferring direction of the base material 45 by the steps of: feeding a resin to be the light-transmissive portions 2, 2, . . . between the die roll 40 and the base material 45; rolling the die roll 40 on the base material; and curing the resin. Then, as described below, after forming the light-absorbing portions 3, 3, . . . , the optical functional sheet layer 10 can be cut out from the sheet 42.

When an optical sheet in which the optical functional sheet layer 10 thus obtained and other layers are laminated is combined with a plasma display panel (hereinafter, referred to as "PDP".), moire interference pattern may occur. In view of inhibiting occurrence of moire interference pattern, light-transmissive portions 2, 2, . . . are preferably arranged parallel and obliquely with respect to the side of the optical functional sheet layer 10. To arrange the light-transmissive portions 2, 2, . . . parallel and obliquely with respect to the side of the optical functional sheet layer 10, as shown in the right part of FIG. 4A, sheets 43, 43, . . . are cut out obliquely from the sheet 42 with respect to the transferring direction of the base material 45 (vertical direction of the right part of FIG. 4A). The slope of the sheets 43, 43, . . . cut out from the sheet 42 is preferably at an angle within the range of more than 0° and 5° or less with respect to the transferring direction of the base material 45. If the angle is too large, it is difficult to improve the contrast when using the optical sheet having the light-transmissive portions 2, 2, . . . .

Alternatively, to arrange the light-transmissive portions 2, 2, . . . parallel and obliquely with respect to the side of the optical functional sheet layer 10, as shown in FIG. 4B, it is preferable to use a die roll 50, where recess portions 51, 51, . . . are formed in the outer circumferential surface in a direction at a certain angle with respect to the circumferential direction. When forming the light-transmissive portions 2, 2, . . . using the die roll 50, it is possible to obtain a sheet 52 in which the light-transmissive portions 2, 2, . . . are formed on the base material 45 parallel and obliquely with respect to the transferring direction of the base material 45 (the direction shown by the arrow in FIG. 4B) by the steps of: feeding a resin to be the light-transmissive portions 2, 2, . . . between the die roll 50 and the base material 45; rolling the die roll 50 on the base material; and curing the resin. Then, as described below, after forming the light-absorbing portions 3, 3, . . . , the optical functional sheet layer 10 can be cut out from the sheet 52.

When using the die roll 50, as shown in the right part of FIG. 4B, by cutting the base material 45 in the direction parallel with the transferring direction (vertical direction of the right part of FIG. 4B), sheets 53, 53, . . . in which the light-transmissive portions 2, 2, . . . are arranged parallel and obliquely with respect to the side of sheet 53 can be obtained; and these sheets are used as the optical functional sheet layer 10.

Moreover, when using the die roll 50, when forming the light-absorbing portions 3, 3, . . . between the light-transmissive portions 2, 2, . . . in the below-described step, it is possible to lower the likelihood of defect in the light-absorbing portions 3, 3, . . . . More specifically, in the step of forming the light-absorbing portions 3, 3, . . . , a binder is filled in the gap between the light-transmissive portions 2, 2, . . . and the excessive binder is strickled. During the step, if bubbles and light-absorbing particles exist on the light-absorbing portions 3, 3, . . . , these may be dragged and may cause streaky defects on the light-absorbing portions 3, 3, . . . . However, as described above, if the light-transmissive portions 2, 2, . . . is obliquely formed with respect to the transferring direction of the base material 45, the light-absorbing portions 3, 3, . . . formed between the light-transmissive portions 2, 2, . . . are also obliquely formed with respect to the transferring direction of the base material 45. Therefore, when strickling excessive binders and so on in the direction parallel with the transferring direction of the base material 45, the likelihood of dragging, the bubbles and light-absorbing particles existing on the light-absorbing portions 3, 3, . . . becomes less. Accordingly, the likelihood of causing defect in the light-absorbing portions 3, 3, . . . can be lowered.

By the sheets 53, 53, . . . , it is possible to obtain the same effect (effect to inhibit moire interference pattern) as that of the sheets 43, 43, . . . obtained by the method described with reference to FIG. 4A. In addition, due to the same reason as that of the method described with reference to FIG. 4A, the recess portions 51, 51, . . . in the surface of the die roll 50 are preferably formed at an angle within the range of more than 0° and 5° or less with respect to the circumferential direction. By the method shown in FIG. 4B, it is possible to cut sheets 53 along the transferring direction of the base material 45, so yield of the method shown in FIG. 4B can be improved more than that of the method shown in FIG. 4A. The die roll of the method shown in FIG. 4A can be easily made.

After forming the light-transmissive portions 2, 2, as shown in FIG. 3B, a binder in which the light-absorbing particles 5, 5, . . . are dispersed is filled in the gap between the light-transmissive portions 2, 2. In this mode, the step for filling a binder in which the light-absorbing particles 5, 5, . . . are dispersed in the gap between the light-transmissive portions 2, 2 (step for forming the light-absorbing portion) is carried out repeatedly to form the light-absorbing portion 3 shown in FIG. 3C. It should be noted that the broken line shown in FIG. 3C indicates the boundary between the mixture of light-absorbing particle and binder filled at the last step for forming the light-absorbing portion and the mixture of the light-absorbing particles and binder filled at the previous step (s) for forming the light-absorbing portion. After curing the binder, these are integrated, so it is hard to see the boundary.

More specifically, the step for forming the light-absorbing portion comprises the steps of: filling the light-absorbing particles 5, 5, . . . and a binder in the gap between the light-transmissive portions 2, 2; strickling the excessive amount of the light-absorbing particles 5, 5, . . . and the binder; and then, curing the binder remaining in the optical functional sheet layer 10. The series of the steps are repeatedly carried out because a recess portion is formed at the upper part of the light-absorbing portion 3 when strickling the excessive light-absorbing particles 5, 5, . . . and binder. In this embodiment, among the plurality of the steps for forming the light-absorbing portions, at least the last step for forming the light-absorbing portions is carried out so that the density of the light-absorbing particles 5, 5, . . . contained in the binder is lower than the density of the same of the first step for forming the light-absorbing portion. Number of the steps for forming the light-absorbing portion and density of the light-absorbing particles 5, 5, . . . contained in the binder are not particularly limited. For example, the steps for forming the light-absorbing portion may be carried out twice; density of the light-absorbing particles 5, 5, . . . contained in the binder can be 15 mass % in the first steps and density of the same can be 5 mass % in the second steps.

In this mode, as described above, among the plurality of the steps for forming the light-absorbing portions, at least the last step for forming the light-absorbing portions is carried out so that the density of the light-absorbing particles 5, 5, . . . contained in the binder is lower than the density of the same of the first step for forming the light-absorbing portion. Therefore, in the light-absorbing portions 3, 3, . . . , density of the light-absorbing particles 5, 5, . . . at the side opposite to the side where the base material layer 1 is provided is lowered. Because of this, when attempting to strickle excessive amount of binder and the light-absorbing particles 5, 5, . . . , the binder to be left in the light-absorbing portions 3, 3, . . . is hardly strickled by the light-absorbing particles 5, 5, . . . protruding from the light-absorbing portions 3, 3, . . . ; thereby, appearance of the optical functional sheet layer 10 can be improved. Moreover, when forming an optical sheet by laminating the optical functional sheet layer having an improved appearance and other layers, the appearance of the optical sheet is improved.

Figure 5:
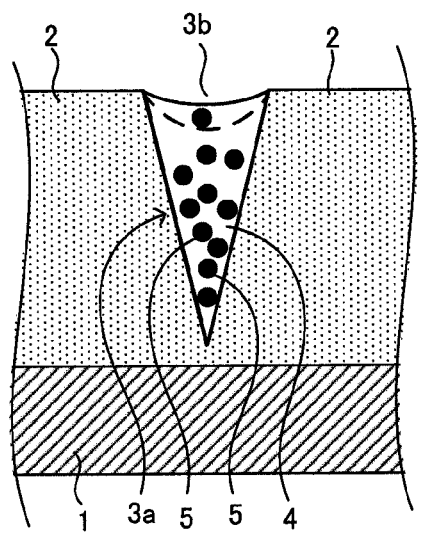
FIG. 5 is a cross-sectional view schematically showing a modified example of the light-absorbing portion.

Although FIGS. 1, 2, and FIGS. 3A to 3C show an example of the optical functional sheet 10 of which bottom of the light-absorbing portions 3, 3, . . . and the upper base of the light-transmissive portions 2, 2, . . . in cross section are aligned on one line, the present invention is not limited to the example. FIG. 5 is a cross-sectional view schematically showing a modified example of the light-absorbing portion, i.e. a light-absorbing portion 3a. As shown in FIG. 5, the example may be the one that a recess portion 3b (space) may be slightly left on top of the light-absorbing portion 3a. In this example, the recess portion over the light-absorbing portion is small. So, the appearance of the optical functional sheet layer is improved.

1.2. The Second Mode

Figure 6:
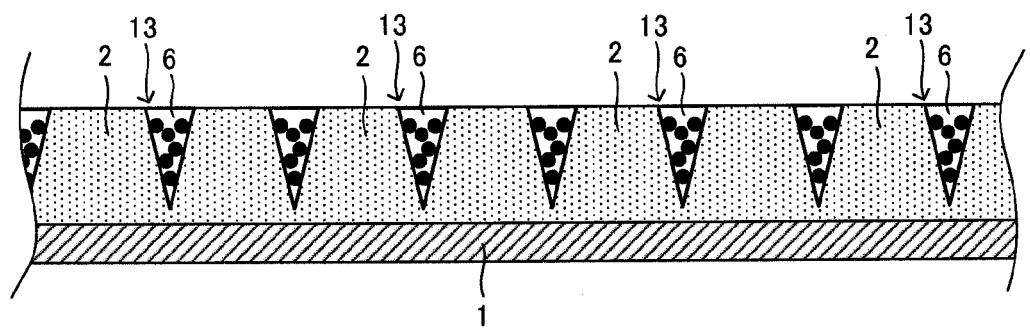
FIG. 6 is a cross-sectional view schematically showing a part of an optical functional sheet layer of an optical sheet obtained by the method for manufacturing optical sheet according to the second mode of the present invention.

Next, the method for manufacturing the optical sheet according to the second mode of the present invention will be described. FIG. 6 is a cross-sectional view schematically showing a part of an optical functional sheet layer 11 of an optical sheet obtained by the method for manufacturing optical sheet according to the second mode of the invention. In FIG. 6, the members having the same structure as those of FIG. 1 are given the same reference numerals and the description is omitted.

The difference between the optical functional sheet layer 11 and the optical functional sheet layer 10 is that a transparent resin 6 is filled on top of the light-absorbing portion 13.

Figure 7A:
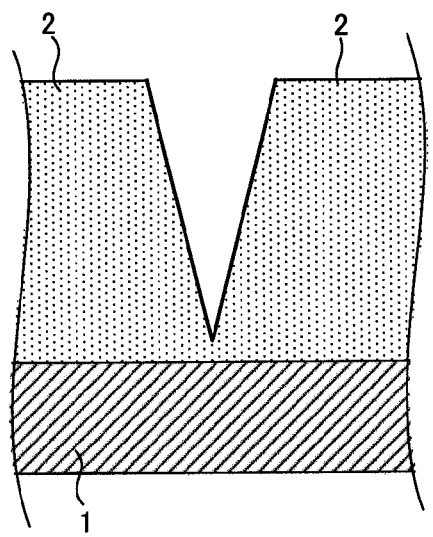
FIGS. 7A, 7B, and 7C are plans to illustrate each manufacturing step of the optical functional sheet layer shown in FIG. 6.
Figure 7B:
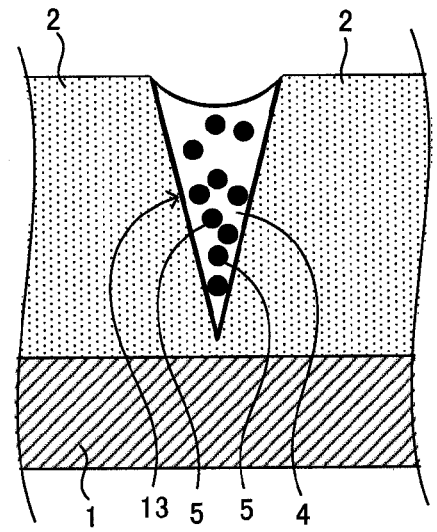
Figure 7C:
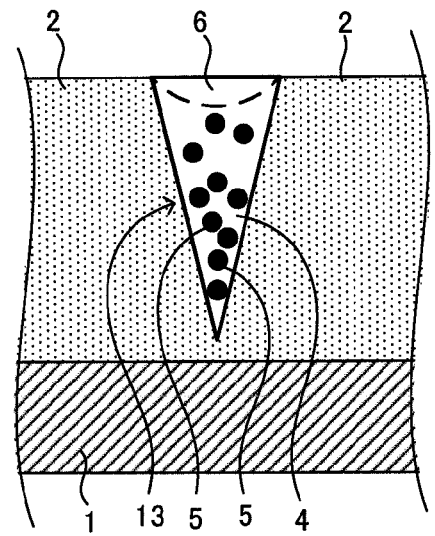

Hereinafter, the method for manufacturing the optical functional sheet layer 11 and the difference between the optical functional sheet layer 11 and the optical functional sheet layer 10 are described. FIGS. 7A, 7B, and 7C are plans to illustrate each manufacturing step of the optical functional sheet layer 11.

As shown in FIG. 7A, the light-transmissive portions 2, 2 are formed on one side of the base material layer 1. The process is the same as that of the above-described optical functional sheet layer 10, so the description is omitted.

After forming the light-transmissive portions 2, 2, as shown in FIG. 7B, a binder in which the light-absorbing particles 5, 5, ... are dispersed is filled at least once in the gap between the light-transmissive portions 2, 2 and the binder is cured to form the light-absorbing portion 13 (step for filling the light-absorbing particles). More specifically, the method for forming the light-absorbing portion comprises the steps of: filling the light-absorbing particles 5, 5, ... and the binder in the gap between the light-transmissive portions 2, 2; then, strickling the excessive amount of the light-absorbing particles 5, 5, ... and the binder; and curing the binder remaining in the optical functional sheet layer. The step of filling the light-absorbing particles may be carried out more than once; or it may be carried out at one time.

In this mode, as shown in FIG. 7C, the transparent resin 6 is filled in the gap between the light-transmissive portions 2, 2 and is cured (the step for filling the transparent resin). More specifically, in the step for filling the light-absorbing particles, when strickling the excessive amount of the light-absorbing particles 5, 5, ... and the binder, the transparent resin 6 is filled in the recess portion formed on top of the light-absorbing portion 13 and the excessive amount of transparent resin 6 is strickled; then, the transparent resin remaining in the optical functional sheet layer 11 is cured. It should be noted that the broken line shown in FIG. 7C indicates a boundary of the light-absorbing portion 13 and the transparent resin 6. The transparent resin 6 is preferably the same as the binder (but does not include the light-absorbing particles 5, 5, ... ) to be filled in the light-absorbing portion 13. If the binder to be filled in the light-absorbing portion 13 is used as the transparent resin 6, the binder filled in the step for filling the light-absorbing particles and the transparent resin 6 filled in the step for filling the transparent resin are integrated; thereby it is difficult to see the boundary.

In the mode, as described above, after the step for forming the light-absorbing portion, the step for filling the transparent resin is carried out. Therefore, when strickling the excessive amount of the transparent resin 6, the portion where the transparent resin 6 is filled is strickled. So, the binder to be left in the light-absorbing portions 13,13, ... is hardly strickled by the light-absorbing particles 5, 5, ... protruding from the light-absorbing portions 13, 13, ... ; thereby the appearance of the optical functional sheet layer can be improved. Moreover, when forming the optical sheet by laminating the optical functional sheet layer 11 having an improved appearance and other layers, the appearance of the optical sheet is improved.

Figure 8:
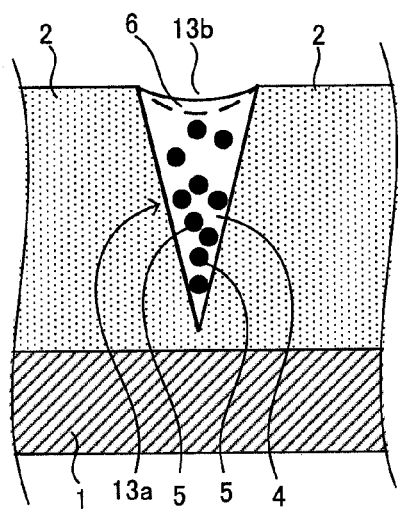
FIG. 8 is a cross-sectional view schematically showing a modified example of the light-absorbing portion.

Although FIG. 6 and FIG. 7C show an example of the optical functional sheet layer of which top surface of the portion where the transparent resin 6 is filled and the upper base of the light-transmissive portions 2, 2, ... in cross section are aligned on one line, the present invention is not limited to the example. FIG. 8 is a cross-sectional view schematically showing a modified example of the light-absorbing portion, i.e. a light-absorbing portion 13a. As shown in FIG. 8, the example may be the one that a recess portion 13b (space) may be slightly left on top of the light-absorbing portion 13a. In this example, the recess portion over the light-absorbing portion is small. So, the appearance of the optical functional sheet layer is improved.

1.3. The Third Mode

Figure 9:
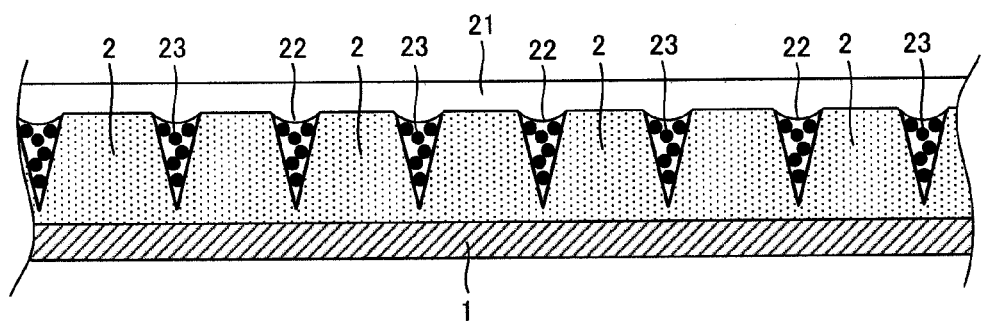
FIG. 9 is a cross-sectional view schematically showing a part of an optical functional sheet layer of an optical sheet obtained by the method for manufacturing optical sheet according to the third mode of the present invention.

FIG. 9 is a cross-sectional view schematically showing a part of an optical functional sheet layer 20 of an optical sheet obtained by the method for manufacturing optical sheet according to the second mode of the invention. In FIG. 9, the members having the same structure as those of FIG. 1 are given the same reference numerals and the description is omitted.

The difference between the optical functional sheet layer 20 and the optical functional sheet layer 10 is that a light-absorbing portion 23 has a recess portion 22 and the side where the recess portions 22 are exposed is covered by a transparent resin 21.

Figure 10A:
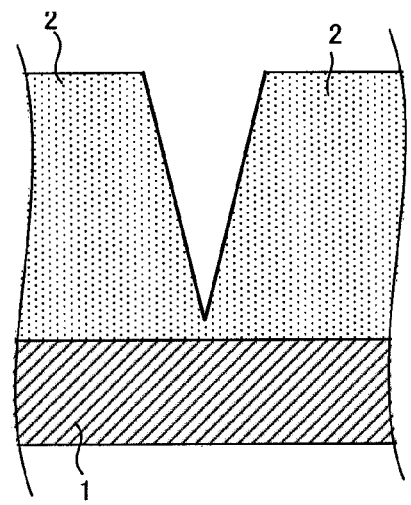
FIGS. 10A, 10B, and 10C are plans to illustrate each manufacturing step of the optical functional sheet layer shown in FIG. 9.
Figure 10B:
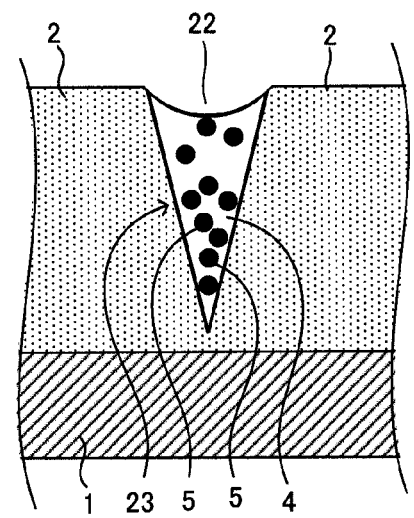
Figure 10C:
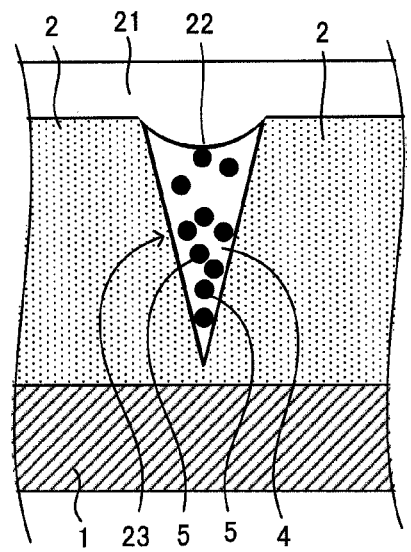

Hereinafter, the method for manufacturing the optical functional sheet layer 20 and the difference between the optical functional sheet layer 20 and the optical functional sheet layer 10 are described. FIGS. 10A, 10B, and 10C are plans to illustrate each manufacturing step of the optical functional sheet layer 11.

As shown in FIG. 10A, the light-transmissive portions 2, 2 are formed on one side of the base material layer 1. The process is same as that of the above-described optical functional sheet layer 10, so the description is omitted.

After forming the light-transmissive portions 2, 2, as shown in FIG. 10B, a binder in which the light-absorbing particles 5, 5, ... are dispersed is filled in the gap between the light-transmissive portions 2, 2 and the binder is cured to form the light-absorbing portion 23. By strickling the excessive amount of light-absorbing particles 5, 5, ... and the binder after filling the light-absorbing particles 5, 5, ... and the binder, the light-absorbing particles 5, 5, ... protruding from the light-absorbing portion 23 are dragged and strickling the binder from the light-absorbing portion 23. Accordingly, the recess portion 22 is formed on top of the light-absorbing portion 23 between the light-transmissive portions 2, 2.

In this mode, after the above steps, recess portions 22 and the side where the recess portions 22 are exposed are coated with the transparent resin 21. The method for coating with the transparent resin 21 is not limited. Examples thereof include: a method comprising the steps of: feeding the transparent resin 21 to the recess portion 22 and the plane of the side where the recess portion 22 is exposed; and strickling the binder loosely with doctor blade by holding the doctor blade at a position slightly away from the surface of the light-transmissive portions 2, 2, ... ; and a method by bar-coating using a mere bar. As the transparent resin 21, the same resin used for the light-transmissive portion 2 can be used. Examples thereof may be a ultraviolet curable resin; a resin containing ultraviolet absorber such as benzotriazole having a ultraviolet absorbing effect; or adhesives.

By coating the surface of the optical functional sheet layer 20 with the transparent resin 21 in this way, it is possible to fill the recess portion 22 by the transparent resin 21 and to improve the appearance of the optical functional sheet layer 20.

Figure 11:
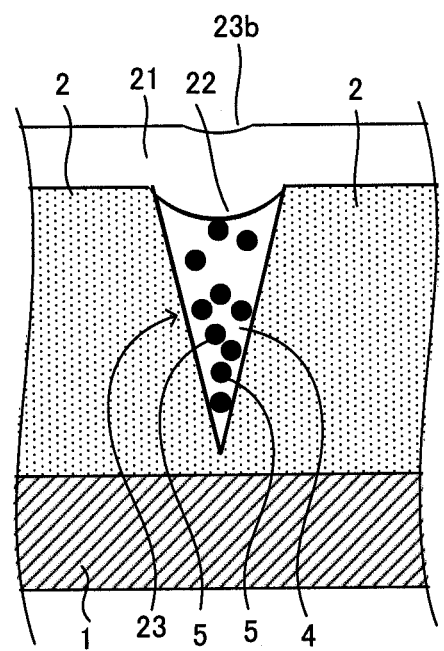
FIG. 11 is a cross-sectional view schematically showing a modified example of the layers comprising the transparent resin 21 shown in FIG. 10C.

Although FIG. 9 and FIG. 10C show an example where the surface of the transparent resin 21 is smooth, the present invention is not limited to the example. FIG. 11 is a cross-sectional view schematically showing a modified example of the layers made of the transparent resin 21 shown in FIG. 10C. As shown in FIG. 11, the example may be the one that a recess portion 23b corresponding to the recess portion 22 may be slightly left in the plane of the transparent resin 21. In this example, the recess portion 23b appears in the surface of the transparent resin 21 is smaller than the recess portion 22 of the light-absorbing portion 23. So, the appearance of the optical functional sheet layer is improved.

When coating the surface of the optical functional sheet 20 with a transparent resin 21, if the transparent resin 21 is filled in by pressing with a mirror-surface imprint mold, the transparent resin 21 side surface becomes mirror surface; thereby, it is possible to obtain an optical functional sheet 20 having an improved appearance. The term "by pressing with a mirror-surface imprint mold" means a molding method by injecting the transparent resin 21 between a mirror-finished face of die and an optical functional sheet 20 to be coated with the transparent resin 21.

Figure 12A:
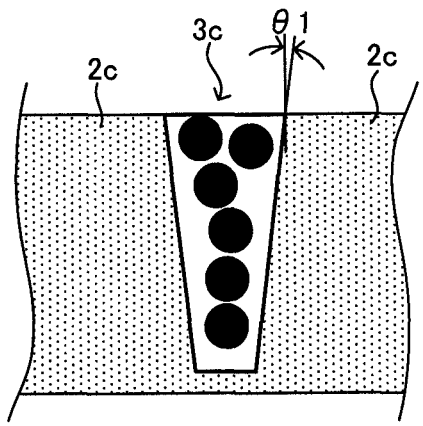
FIGS. 12A, 12B, and 12C are plans showing other examples of the shape of the light-transmissive portions and the light-absorbing portion.
Figure 12B:
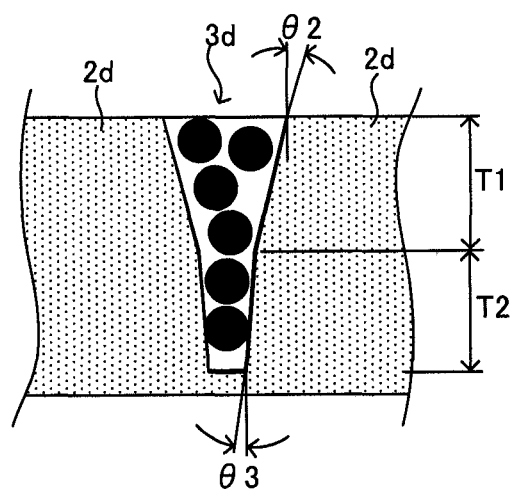
Figure 12C:
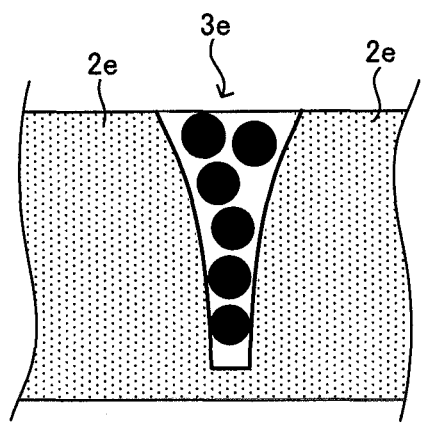

In the above description, an embodiment of which cross-sectional shape of the light-absorbing portion is substantially triangle having two oblique right lines is described. However, the invention is not limited by the example. FIGS. 12A to 12C show other examples of the cross-sectional shape of the light-absorbing portion. FIG. 12A shows an example of which cross-sectional shape of the light-absorbing portion 3c is trapezoid; FIG. 12B shows an example of which cross-sectional shape of the light-absorbing portion 3d has polygonal oblique lines; FIG. 12C shows an example of which cross-sectional shape of the light-absorbing portion 3e has curved oblique lines.

In the case of FIG. 12A, the cross-sectional shape of the light-absorbing portion 3c is trapezoid; more specifically, the cross-sectional shape of the light-absorbing portion 3c is a substantially regular trapezoid consisting of: an upper base and a lower base arranged in parallel; and two oblique lines respectively connecting the upper base and the lower base. The oblique line intersects with the normal to the output plane of the optical sheet at an angle of $\theta 1$. The angle $\theta 1$ is preferably in a range of more than 0 and 10 or less; more preferably more than 0 and 6 or less.

In the case of FIG. 12B, an oblique line of the light-absorbing portion 3d (an oblique line of the light-transmissive portions 2d, 2d) consists of two lines, but not a single line. In other words, the cross-sectional shape has polygonal lines. More specifically, the lower base side oblique line (upper side of FIG. 12B) makes an angle of $\theta 2$ with a normal to the output plane of the optical sheet. The upper base side oblique line (lower side of FIG. 12B) makes an angle of $\theta 3$ with a normal to the output plane of the optical sheet. There is a relation: $\theta 2 > \theta 3$. Both $\theta 2$ and $\theta 3$ are preferably within the range of more than 0° and 10° or less, and more preferable angles are within the range of more than 0° and 6° or less. As shown in FIG. 12B, the size of the oblique line is defined by T1 and T2 in the thickness direction of the optical functional sheet layer (vertical direction of FIG. 12B). The length of T1 and T2 are preferably the same.

Although each side of the oblique line in the example of FIG. 12B consists of two oblique lines, the oblique line may be formed by polygonal line having more than two lines.

In the case of FIG. 12C, the oblique line of the light-absorbing portion 3e (the oblique line of the light-transmissive portions 2e, 2e, . . . ) is a curved line. In this way, the oblique line of the substantially triangle cross-sectional shape of the light-absorbing portion may be a curved line. In this case, the angle between the curved line and the normal to the output plane of the sheet of the optical sheet at the upper-base-side (lower side in FIG. 12C) is preferably smaller than the angle at the lower-base-side (upper side in FIG. 12C). In addition, every angle on the curved line is preferably within the range of more than 0° and 10° or less, and more preferably within the range of more than 0° and 6° or less. The angle between the curved line and the normal to the output plane of the sheet is defined by an angle between the normal to the output plane of the sheet and lines made by dividing a curved line into ten equal parts and connecting two adjacent ends of the segments.

The shape of the light-absorbing portion is not limited to the examples; it can be adequately modified as long as the shape is suitable for absorbing the external light. For example, substantially rectangle cross-sectional shape may be possible.

2. Optical Sheet

The optical sheet of the present invention comprises: at least one optical functional sheet layer obtained by the above described method for manufacturing the optical functional sheet; and other layers having various functions, as needed. The layer to be provided to the optical sheet of the invention may be a layer used for the conventional optical sheets and it is not particularly limited. Specific examples thereof include: antireflection layer, adhesive layer, electromagnetic wave shielding layer, wavelength filter layer, anti-glare layer, and hard coating layer. The laminating order and number the layers to be laminated are determined depending on the application of the optical sheet. Hereinafter, the functions and so on of these layers will be described.

The antireflection layer is a layer provided at the nearest side to the observer and has a function of preventing reflection of external light. By the antireflection layer, it is possible to inhibit reflection of the external light at the surface of the observer side of the optical sheet and returning of the reflected light to the observer side that makes it difficult to see the image. Such an antireflection layer can be formed, for example, by using a commercially available antireflection film.

The adhesive layer is a layer in which adhesive is provided; an example of the adhesive may be acrylic adhesive. However, the kind of adhesive is not limited to the acrylic adhesive as long as the adhesive has required performances such as optical transparency, adhesiveness, and weatherability. The adhesive force is preferably, for example, from several to 20 N/25 mm. When the adhesive layer is applied on a glass surface, in view of rework in the production process and recycling, from several to 10 N/25 mm is more preferable. When the adhesive layer is adhered to contact electromagnetic wave shielding layer, antioxidant (e.g. benzotriazole) is preferably contained or acid group (e.g —COOH) is not preferably contained. Moreover, depending on the layer structure, so as to prevent deterioration of the pigment, UV absorber to absorb ultraviolet ray (e.g. benzotriazole) is desirably included in the adhesive.

The electromagnetic wave shielding layer is literally a layer having a function to shield electromagnetic wave. As long as the layer has this function, the means for shielding electromagnetic wave is not particularly limited. Examples thereof may be a copper mesh. Examples of the method for obtaining the copper mesh include etching and vapor deposition; by the method, it is effective to form a fine copper mesh. Pitches and so on of the copper mesh can be adequately designed depending on the electromagnetic wave to be shielded; a mesh having a pitch of about 300 μm and a line width of 12 μm may be exemplified.

The wavelength filter layer has a function of filtering a light of certain wavelength. As required, the wavelength to be filtered can be adequately selected; the wavelength filter layer can have functions of cutting neon line emitted from the PDP and cutting infrared rays and near-infrared ray.

The anti-glare layer (it is also called AG layer) is a layer to inhibit glare. As the anti-glare layer, commercially available one can be used.

The hard coating layer is also called HC layer. The hard coating layer is a layer made of a film which exhibits abrasion-resistant to protect the image display from scratching.

Accordingly, since the optical sheet of the present invention has the above described optical functional sheet layer having an improved appearance, the appearance of the optical sheet is also improved.

3. Image Display Device

The image display device of the present invention comprises the above-described optical sheet of the invention. For example, when using PDP as an image light source, by laminating the optical sheet of the invention on the PDP, a plasma display can be obtained. If the light source and a liquid crystal panel are combined, it is possible to obtain a liquid crystal display device.

Hereinafter, the invention will be more specifically described by way of the following examples. However, the invention is not limited by the examples.

EXAMPLES

Example 1

(1) Preparation of a Composition Constituting the Light-Transmissive Portion

To a reactor, 53.3 parts by mass of bisphenol-A/ethyleneoxide 2 mole-adduct, 34.0 parts by mass of xylylene diisocyanate, and 93.5 parts by mass of phenoxyethyl acrylate were added and reacted at 80° C. for 5 hours; then, 6.2 parts by mass of 2-hydroxyethyl acrylate and 0.03 parts by mass of urethanizing catalyst were added and reacted at 80° C. for 5 hours, to obtain a urethane acrylate-based oligomer (i.e. a light curable oligomer).

Then, 32.0 parts by mass of the above light curable oligomer, 35.0 parts by mass of phenoxyethyl acrylate (as a light curable monomer), 30.0 parts by mass of diacrylate of bisphenol-A/ethyleneoxide 4 mole-adduct (as a light curable monomer), 0.5 parts by mass of phosphate ester of tetradecanolethylene oxide 10 mole-adduct (as a mold release agent; monoester/diester=1/1 by mole ratio), and 3 parts by mass of 1-hydroxycyclohexyl phenyl ketone (as a photopolymerization initiator; commodity name: "IRGACURE 184" manufactured by Ciba Speciality Chemicals) were mixed and homogenized, to obtain a composition constituting the light-transmissive portion 30 (See FIG. 13.).

(2) Production of a Base Material with Adhesive Layer

The adhesive coating fluid was obtained by mixing: 100 parts by mass of an acrylic resin adhesive ("SK dyne 2094" manufactured by Soken Chemical & Engineering Co., Ltd., solid content: 25.0 mass %, solvent: ethyl acetate and methylethyl ketone); 0.28 parts by mass of a crosslinking agent ("E-5XM", "L-45" manufactured by Soken Chemical & Engineering Co., Ltd., solid content: 5.0 mass %); 0.25 parts by mass of 1,2,3-benzotriazole; 32 parts by mass of diluting solvent (toluene/methylethyl ketone/cyclohexanone=27.69 g/27.69 g/4.61 g).

The obtained adhesive coating fluid was applied to a PET film ("A4300" manufactured by Toyobo Co., Ltd., thickness: 100 μm) with a thickness of 25 μm and dried to form an adhesive layer on one surface of the PET film. Then, a mold release film ("E7007" manufactured by Toyobo Co., Ltd.) having a thickness of 38 μm was adhered on the adhesive layer, to form a base material with an adhesive layer (hereinafter, referred to as "base material 1'".)

(3) Formation of the Light-Transmissive Portions

Figure 13:
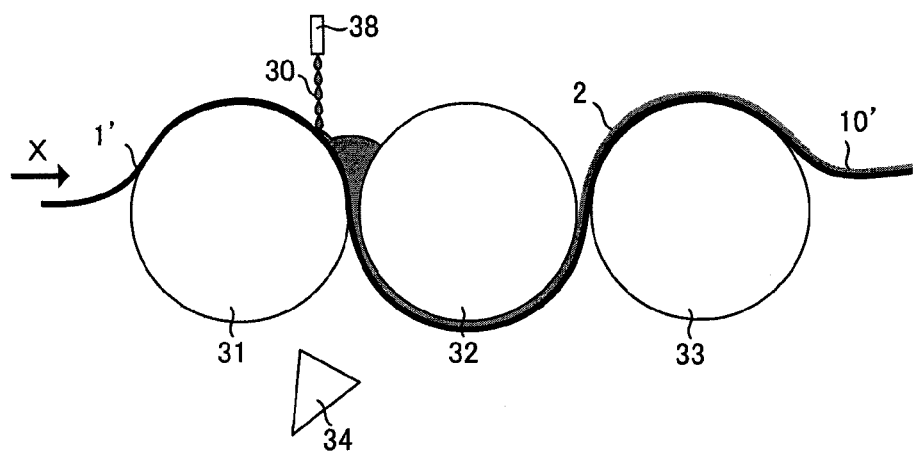
FIG. 13 is a plan schematically showing an apparatus for forming the light-transmissive portions.

The light-transmissive portions were formed by using an apparatus shown in FIG. 13. More specifically, firstly, the base material 1' formed in the above step (2) was transported in the arrow x-direction so that the base material 1' was fed between a die roll 32 and a nip roll 31. The die roll 32 has a cylindrical shape and the outer circumferential surface has a plurality of grooves cut in a row in the circumferential direction. In other words, to the die roll 32, in the cross section of the grooves in the direction orthogonal to the width direction, each of the groove is a trapezoid of which upper base has a width (i.e. length of the outer circumferential side of the die roll) of 47 μm, of which lower base has a width (i.e. length of the central axis side of the die roll) of 41 μm, and of which depth is 69 μm; and the grooves were formed periodically at a pitch of 51 μm. When feeding the base material 1' between the die roll 32 and the nip roll 31, the composition constituting the light-transmissive portion 30 prepared in the above step (1) was fed on the base material 1' (i.e. on the surface of the side where the adhesive layer was not applied.) at the same time from the feeder 38. The composition constituting the light-transmissive portion 30 was pressed between the die roll 32 and the nip roll 31; then, by irradiating ultraviolet of 800 mJ/cm$^2$ by high-pressure mercury vapor lamp from the base material 1' side to the composition constituting the light-transmissive portion, the composition constituting the light-transmissive portion 30 was cured, to form the light-transmissive portion 2 on the base material 1'. Thereafter, the light-transmissive portion 2 was separated from the molding die roll 32 by using mold-releasing nip roll 33; accordingly, a sheet (i.e. an intermediate member) 10' having a thickness of 252±20 μm including the light-transmissive portion 2 was formed.

(4) Preparation of the Composition Constituting the Light-Absorbing Portion

In a reactor, 20.0 parts by mass of oxirane-2,2'-[(1-methylethylidene)bis(4,1-phenyleneoxymethylene)]bis-, homopolymer, 2-propenoate (as an epoxy acrylate oligomer, a light curable oligomer); 20.0 parts by mass of 2-phenoxyethyl acrylate (as a light curable monomer); 20.0 parts by mass of α-acryloyl-ω-phenoxy poly(oxyethylene) (as a light curable monomer); 13.0 parts by mass of 2-{2-[2-(acryloyloxy)(methyl)ethoxy](methyl)ethoxy}methyl)ethyl acrylate (as a light curable monomer); 20.0 parts by mass of acrylic crosslinked particulates containing carbon black having an average diameter of 4.0 μm at a ratio of 25% (as a light-absorbing particle, manufactured by GANZ CHEMICAL CO., LTD.); and 7 parts by mass of 1-hydroxycyclohexyl phenyl ketone (as a photopolymerization initiator; commodity name: "IRGACURE 184" manufactured by Ciba Speciality Chemicals) were mixed and homogenized, to obtain the composition constituting the light-absorbing portion 36 (See FIG. 14.).

(5) Formation of the Light-Absorbing Portion

Figure 14:
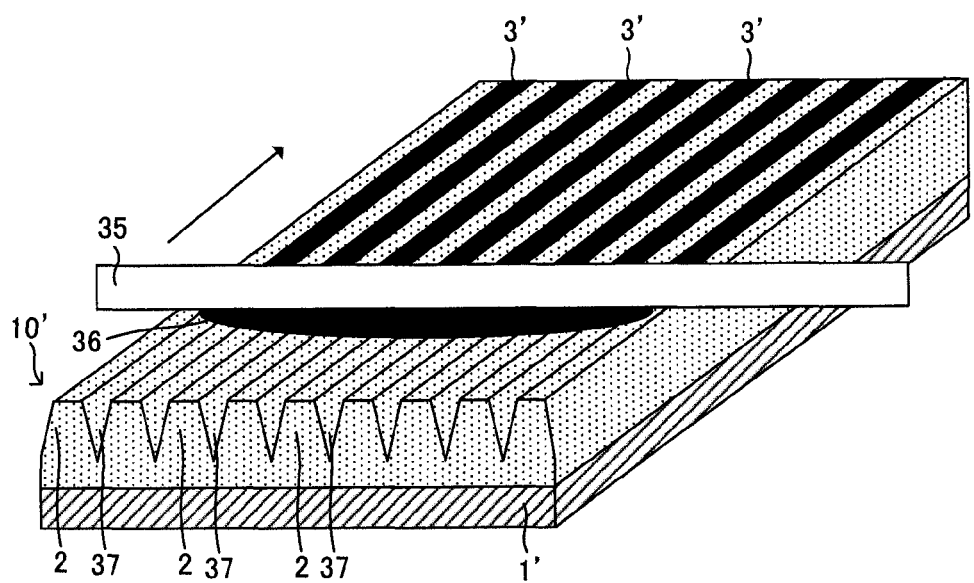
FIG. 14 is a plan schematically showing an apparatus for forming the light-absorbing portions.

The light-absorbing portions were formed by using an apparatus shown in FIG. 14. More specifically, firstly, the composition constituting the light-absorbing portion 36 prepared in the above step (4) was fed from a feeder (not shown) onto the intermediate member 10' formed in the above step (3). Then, by using a doctor blade 35 substantially perpendicularly-provided with respect to the transferring direction of the intermediate member 10' (the arrow direction shown in FIG. 14), the composition constituting the light-absorbing portion 36 fed onto the intermediate member 10' was filled in the substantially V-shape grooves (groove between the light-transmissive portions 2, 2) 37, 37, . . . and the excessive amount of the composition constituting the light-absorbing portion 36 was strickled. Thereafter, by irradiating the composition constituting the light-absorbing portion 36 filled in the grooves 37, 37, . . . with ultraviolet ray to cure the composition constituting the light-absorbing portion 36; and a part of the light-absorbing portions 3', 3', . . . were formed by the cured composition constituting the light-absorbing portion 36. In this state, the surface of each light-absorbing portion 3' had at most 5 µm deep recess from the surface level of the light-transmissive portions 2, 2, . . . .

Next, the density of the light-absorbing particles contained in the composition constituting the light-absorbing portion prepared in the above step (4) was changed to 5.0 parts by mass; by using a similar apparatus to the one shown in FIG. 14, the composition constituting the light-absorbing portion was filled in the grooves between the light-transmissive portions and the excessive amount of the composition constituting the light-absorbing portion was strickled with a doctor blade. Then, by irradiating the composition constituting the light-absorbing portion with ultraviolet ray, the composition was cured and the formation of the light-absorbing portion was completed. As a result, the depth of the surface recess of the light-absorbing portion was improved to be 2 µm; so, it was possible to produce an optical functional sheet layer having no streaky and belt-like unevenness. The term "streaky unevenness" means a defect in appearance which can be seen as white streaky lines in the longitudinal direction of the light-absorbing portion when observing the appearance particularly from a high angle. As a phenomenon, in one light-absorbing portion, the resin constituting the light-absorbing portion is not sufficiently filled locally, thereby there is a recess. The term "belt-like unevenness" means a defect in appearance where contrast can be observed over a wide range in the longitudinal direction of the light-absorbing portion. As a phenomenon, in a plurality of the light-absorbing portion, there are areas where filling of the resin constituting the light-absorbing portion is sufficient and insufficient.

Example 2

The composition constituting the light-absorbing portion was once filled in the groove and cured in the same manner as Example 1; then, by using a similar apparatus to the one shown in FIG. 14, a composition constituting the light-absorbing portion prepared in the above step (4) but excluding the light-absorbing particles (i.e. a transparent resin) was filled in the grooves between the light-transmissive portions, and the excessive amount of the composition was strickled with a doctor blade. Then, by irradiating the composition with ultraviolet ray, the composition was cured; and the depth of the surface recess of the light-absorbing portion was improved to be 2 µm. So, it was possible to produce an optical functional sheet layer having no streaky and belt-like unevenness.

Example 3

The composition constituting the light-absorbing portion was once filled in the groove and cured in the same manner as Example 1; then, a composition constituting the light-absorbing portion prepared in the above step (4) but excluding the light-absorbing particles (i.e. a transparent resin) was supplied on the light-absorbing portions 3c, 3c, . . . and the light-transmissive portions 2, 2, . . . . Then, the composition was strickled by using a doctor blade so that the composition covers not only over the light-absorbing portions 3c, 3c, . . . but also over the light-transmissive portions 2, 2, . . . ; and cured by irradiation with ultraviolet ray. As a result, the depth of the surface recess of the light-absorbing portion was improved to be 0.5 µm. So, it was possible to produce an optical functional sheet layer having no streaky and belt-like unevenness.

Example 4

The composition excluding the light-absorbing particle (the transparent resin) was supplied to the light-absorbing portion 3c, 3c, . . . and the light-transmissive portions 2, 2, . . . in the same manner as Example 3; then, the surface of the side where the composition was supplied was pressed with a mirror-surface imprint mold, and cured by irradiation with ultraviolet. As a result, the depth of the surface recess of the light-absorbing portion was improved to be 0 µm. So, it was possible to produce an optical functional sheet layer having no streaky and belt-like unevenness.

Comparative Example 1

Except for changing the density of the light-absorbing particles contained in the composition constituting the light-absorbing portion to be filled in the second round to 25.0 parts by mass, Comparative example 1 was carried out in the same manner as Example 1 to produce an optical functional sheet layer. As a result, although the depth of the surface recess of the light-absorbing portion was improved to be 2 µm, however, streaky and belt-like unevenness occurred.

About the optical functional sheet layers produced in the above Examples 1 to 4 and Comparative example 1, presence or absence of "streaky unevenness" and "belt-like unevenness" was visually observed. The evaluation and the haze measured by a haze meter (in accordance with JIS K7105) is shown in Table 1. It should be noted that when measuring haze, the light was irradiated from the base material layer side so that the longitudinal direction of the light-absorbing portion became vertical with respect to the horizontal plane. In Table 1, the absence of "streaky unevenness" is indicated as "◯" and the presence of "streaky unevenness" is indicated as "x". Also, the absence of "belt-like unevenness" is indicated as "◉" and slight occurrence of "belt-like unevenness" is indicated as "◯". With regard to haze, specific numbers are shown.

TABLE 1

|  | Streaky unevenness | Belt-like unevenness | Haze |
|---|---|---|---|
| Example 1 | ◯ | ◉ | 18% |
| Example 2 | ◯ | ◯ | 12% |
| Example 3 | ◯ | ◯ | 11% |
| Example 4 | ◯ | ◯ | 9% |
| Comparative example 1 | X | ◯ | 25% |

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that the method for manufacturing an optical sheet, the optical sheet, and the image display device with such an alternation are included in the technical scope of the invention.

What is claimed is:

1. A method for manufacturing optical sheet having a plurality of layers in which at least one layer is an optical functional sheet layer comprising: light-transmissive portions configured to be arranged in a row along the surface of a base material layer; and light-absorbing portions arranged between the light-transmissive portions, the method comprising the steps of:

forming the light-transmissive portions on one side of the base material layer; and forming the light-absorbing portions by repeatedly carrying out, in each of the gaps between the light-transmissive portions, filling of a binder made of a resin in which light particles are dispersed and curing of the binder, wherein at least the last step of the repeating step for forming the light-absorbing portions is carried out so that the density of the light-absorbing particles contained in the binder is lower than the density of the same at the first step for forming the light-absorbing portions.

2. A method for manufacturing optical sheet having a plurality of layers in which at least one layer is an optical functional sheet layer comprising: light-transmissive portions configured to be arranged in a row along the surface of a base material layer; and light-absorbing portions arranged between the light-transmissive portions, the method comprising the steps of:

forming the light-transmissive portions on one side of the base material layer;

forming the light-absorbing portions by, at least once, filling a binder made of a resin in which light-absorbing particles are dispersed in the gaps between the light-transmissive portions and curing the binder; and then, filling a transparent resin on the light-absorbing portions in the gap between the light-transmissive portions and curing the transparent resin.

3. A method for manufacturing optical sheet having a plurality of layers in which at least one layer is an optical functional sheet layer comprising: light-transmissive portions configured to be arranged in a row along the surface of a base material layer; and light-absorbing portions arranged between the light-transmissive portions, the method comprising the steps of:

forming the light-transmissive portions on one side of the base material layer;

forming the light-absorbing portions by filling a binder made of a resin in which light-absorbing particles are dispersed in the gaps between the light-transmissive portions;

strickling the excessive amount of binder overflowing from the gaps between the light-transmissive portions; and then, coating, with a transparent resin not being an adhesive, a plane where recess portions formed by strickling are exposed.

4. A method for manufacturing optical sheet having a plurality of layers in which at least one layer is an optical functional sheet layer comprising: light-transmissive portions configured to be arranged in a row along the surface of a base material layer; and light-absorbing portions arranged between the light-transmissive portions, the method comprising the steps of:

forming the light-transmissive portions on one side of the base material layer;

forming the light-absorbing portions by filling a binder made of a resin in which light-absorbing particles are dispersed in the gaps between the light-transmissive portions;

strickling the excessive amount of binder overflowing from the gaps between the light-transmissive portions; and then, filling a transparent resin in a plane where recess portions formed by strickling are exposed, by pressing with a mirror-surface imprint mold.

5. An optical sheet having a plurality of layers in which at least one layer is an optical functional sheet layer comprising: light-transmissive portions configured to be arranged in a row along the surface of a base material layer; and light-absorbing portions arranged between the light-transmissive portions, the light-absorbing portions being filled with binder in which light-absorbing particles are dispersed, and the density of the light-absorbing particles of the light-absorbing portions in the base material layer side being higher than the density of the light-absorbing particles of the light-absorbing portions in the opposite side.

6. An image display device comprising the optical sheet according to claim 5.

7. An optical sheet having a plurality of layers in which at least one layer is an optical functional sheet layer comprising: light-transmissive portions configured to be arranged in a row along the surface of a base material layer; and light-absorbing portions arranged between the light-transmissive portions, the light-absorbing portions being filled with binder in which light-absorbing particles are dispersed, and the surface including recess portions formed between the light-transmissive portions being coated with a transparent resin not being an adhesive.

8. The optical sheet according to claim 7, wherein a surface of the optical functional sheet layer coated with the transparent resin is a mirror plane.

9. An image display device comprising the optical sheet according to claim 7.

10. An image display device comprising the optical sheet according to claim 8.

* * * * *